(12) United States Patent
Wang et al.

(10) Patent No.: US 9,564,632 B2
(45) Date of Patent: Feb. 7, 2017

(54) LAYERED TITANIUM DISILICIDE, METHOD OF PREPARATION AND APPLICATIONS THEREOF

(71) Applicant: The Trustees of Boston College, Chestnut Hill, MA (US)

(72) Inventors: Dunwei Wang, Newton Highlands, MA (US); Sa Zhou, Fremont, CA (US)

(73) Assignee: The Trustees of Boston College, Chestnut Hill, MA (US)

( * ) Notice: Subject to any disclaimer, the term of this patent is extended or adjusted under 35 U.S.C. 154(b) by 441 days.

(21) Appl. No.: 14/203,598

(22) Filed: Mar. 11, 2014

(65) Prior Publication Data

US 2014/0295268 A1    Oct. 2, 2014

Related U.S. Application Data

(60) Provisional application No. 61/777,885, filed on Mar. 12, 2013.

(51) Int. Cl.
| | |
|---|---|
| *H01M 4/36* | (2006.01) |
| *H01M 4/58* | (2010.01) |
| *C22C 29/18* | (2006.01) |
| *H01M 10/0525* | (2010.01) |

(52) U.S. Cl.
CPC .............. *H01M 4/366* (2013.01); *C22C 29/18* (2013.01); *H01M 4/58* (2013.01); *H01M 10/0525* (2013.01)

(58) Field of Classification Search
CPC .............................. H01M 4/386; C22C 29/18
See application file for complete search history.

(56) References Cited

PUBLICATIONS

Zhou, S.; Liu, X.; Wang, D.Si/TiSi2 Heteronanostructures as High-Capacity Anode Material for Li Ion Batteries Nano Lett. 2010, 10, 860-863.*
Abel, Paul R., et al. "Improving the stability of nanostructured silicon thin film lithium-ion battery anodes through their controlled oxidation." ACS nano 6.3 (2012): 2506-2516.*
Zhou, Sa, et al. "Layered titanium disilicide stabilized by oxide coating for highly reversible lithium insertion and extraction." ACS nano 6.9 (2012): 8114-8119.*

* cited by examiner

*Primary Examiner* — Richard M Rump
(74) *Attorney, Agent, or Firm* — Milstein Zhang & Wu LLC

(57) ABSTRACT

The invention generally relates to new materials based on C49 titanium disilicide ($TiSi_2$) as a new, layered anode material, within which lithium ions can react with the Si-only layers. Stabilization by a coating a thin layer of oxide on the surface of $TiSi_2$ significantly improves the charge and discharge performance.

11 Claims, 14 Drawing Sheets

US 9,564,632 B2

LAYERED TITANIUM DISILICIDE, METHOD OF PREPARATION AND APPLICATIONS THEREOF

PRIORITY CLAIMS AND RELATED APPLICATIONS

This application claims the benefit of U.S. Provisional Application No. 61/777,885, filed Mar. 12, 2013, the entire content of which is incorporated herein by reference in its entirety.

TECHNICAL FIELDS OF THE INVENTION

The invention generally relates to novel materials having layered structures at the nano-scale. More particularly, the invention relates to uniquely layered structures comprising $TiSi_2$ and compositions and methods thereof, for example, for use in preparation of anodes in lithium ion batteries.

BACKGROUND OF THE INVENTION

Lithium-ion batteries are found in a fast-growing number of products, from consumer electronics, such as cell phones, PDAs and laptops, to electric vehicles, airplanes and aerospace equipment. As one of the most popular types of rechargeable battery for portable electronics, lithium-ion batteries have superior energy densities, no memory effect, and a slow loss of charge when not in use. Lithium-ion batteries are becoming a common replacement for the lead acid batteries. A lightweight lithium/carbon negative electrodes and lithium iron phosphate positive electrodes are clearly favored over the heavy lead plates and acid electrolyte.

With significant advantages such as long cycle lifetimes and relatively high specific capacities, the lithium-ion battery is becoming a prevailing energy storage technology. Its development has benefited from the discovery of key new electrode materials, including graphite and $LiCO_2$ acting as an anode and a cathode, respectively. (Kazunori, et al. 1994 *Solid State Ionics* 69, 212-221.) These materials often exhibit a layered structure, which allows for $Li^+$ insertion and extraction with minimal influence on the host structure, thereby enabling long cycle lifetimes. (Tarascon, et al. 2001 *Nature* 414, 359-367.) The measured specific capacities of these materials, however, are limited by their chemical nature and now fail to meet the ever-growing needs. (Armand, et al. 2008 *Nature* 451, 652-657.) In comparison, high-capacity materials lacking a layered structure, such as Si, Si-alloys, Sn, and $SnO_2$, suffer from short cycle lifetimes due to structural degradations caused by $Li^+$ insertion and extraction. (Kim, et al. 2008 *Angew. Chem., Int. Ed.* 47, 10151-10154; Hu, et al. 2008 *Angew. Chem., Int. Ed* 47, 1645-1649; Chan, et al. 2008 *Nat. Nanotechnol.* 3, 31-35; Kasavajjula, et al. 2007 *J. Power Sources* 163, 1003-1039; Wolfenstine, et al. 2003 *J. Power Sources* 124, 241-245; Liu, et al. 2007 *J. Electrochem. Soc.* 154, A97-A102; Roberts, et al. 2002 *J. Power Sources* 110, 424-429; Deng, et al. 2009 *Angew. Chem., Int. Ed.* 48, 1660-1663; Yu, et al. 2009 *Angew. Chem., Int. Ed.* 48, 6485-6489; Park, et al. 2007 *Angew. Chem., Int. Ed.* 46, 750-753; Paek, et al. 2008 *Nano Lett.* 9, 72-75.)

Thus, a critical unmet need remains for novel layered materials with high specific capacities should therefore be important in the development of lithium-ion battery technology.

SUMMARY OF THE INVENTION

The invention provides novel, uniquely layered structures comprising $TiSi_2$ and compositions and methods thereof, for example, for use in preparation of anodes in lithium ion batteries.

The layered structures of the invention are significant in part because they allow highly repeatable ionic insertion and extraction. Examples include C49 titanium disilicide ($TiSi_2$) as a layered anode material, within which lithium ions can react with the Si-only layers. This result is enabled by the strategy of coating a thin (<5 nm) layer of oxide on the surface of $TiSi_2$. The coating stabilizes $TiSi_2$ and significantly improves the charge and discharge performance of $TiSi_2$.

A number of advantages are provided by the present invention. First, as a Si-based material, the $TiSi_2$ nanonet of the invention offers high gravitational capacity. Second, $TiSi_2$ nanonet has layered crystal structure, enabling little structure change upon lithium insertion and extraction. In addition, the high conductivity of $TiSi_2$ makes it suitable for fast charging/discharging rates. Furthermore, the cost for material and production is potentially low.

In one aspect, the invention generally relates to a titanium disilicide ($TiSi_2$) substrate characterized by a layered crystalline structure exhibiting Si only layers, wherein the $TiSi_2$ substrate is at least partially coated with a thin layer of an oxide having a thickness from about 0.1 nm to about 10 nm, preferably less than about 5 nm.

In another aspect, the invention generally relates to an anode material. The anode material includes the titanium disilicide substrate disclosed herein.

In yet another aspect, the invention generally relates to a battery comparing an anode comprising the titanium disilicide substrate disclosed herein. The anode material of the invention may be suited for use in lithium-ion batteries of various types.

In yet another aspect, the invention generally relates to an article of manufacture comprising a battery having an anode that comprises the titanium disilicide substrate disclosed herein.

In yet another aspect, the invention generally relates to a method for preparing nanonets of titanium disilicide ($TiSi_2$) useful as an anode material. The method includes: reacting $TiCl_4$ and $SiH_4$ in a $H_2$-rich environment at an elevated temperature for a time sufficient to form $TiSi_2$ nanonets; exposing as-formed $TiSi_2$ nanonets to ambient air; and allowing exposed $TiSi_2$ nanonets to cool to room temperature naturally to form a layer of $SiO_2$ thereon.

DESCRIPTION OF THE INVENTION

The invention provides novel, uniquely layered structures of $TiSi_2$ and compositions and methods thereof suitable for use in a variety of application, for example, in preparation of anodes in lithium ion batteries. The present invention enables a next-generation anode for lithium-ion batteries, which offer higher specific capacity, power density and long cycle lifetime. Compared with existing solutions, anodes according to the present invention significantly increases energy density and improve stability and have the potential to be used in super capacitors, solar cells and electronic devices and integrated circuits.

Embodiments of the invention include a novel anode material comprising the layered structures of $TiSi_2$. Embodiments of the invention also include methods for preparing the layered structures of $TiSi_2$ and anodes and lithium-ion batteries employing the layered structures of $TiSi_2$ having a thin coating layer of an oxide, which enables high specific capacity and long cycle lifetime.

Exemplary embodiments of the invention include the $TiSi_2$ nanonets having flat Si-only layers separated by polyhedrons of Ti and Si. A unique strategy of coating a thin layer (e.g., less than 5 nm thick) of an oxide on the surface of $TiSi_2$ allows Li ions to be reversibly stored and released within the Si-only layers with little structural change. Considering each Si atom alloys with 4 Li ions, the capacity of the $TiSi_2$ nanonets can each be as high as about 1029 mAh/g. Embodiments of this invention include $TiSi_2$ nanonets that offer a capacity close to about 750 mAh/g having less than about 20% decay with 500 cycles.

Figure 1:
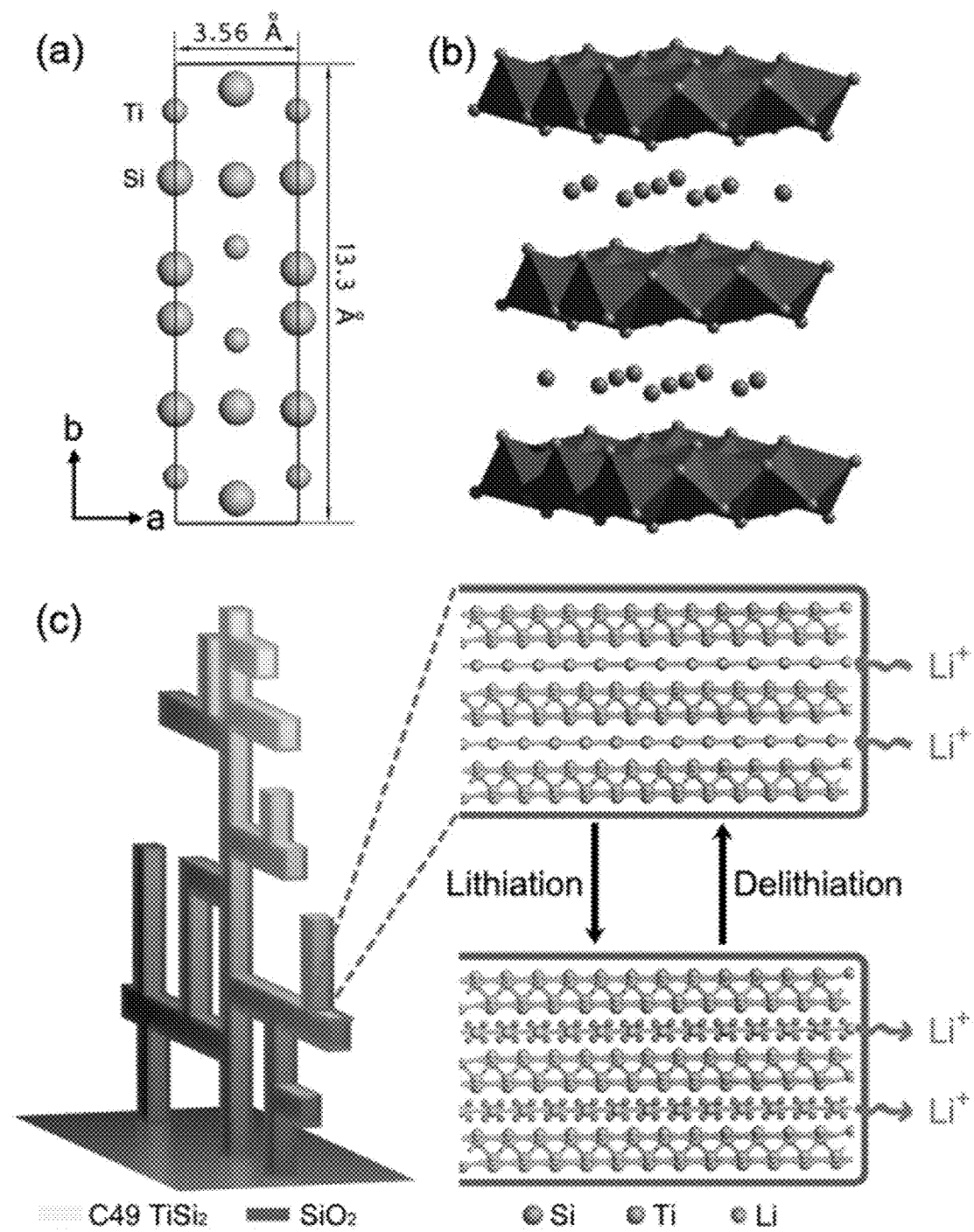
FIG. 1. Schematic illustration of the C49 $TiSi_2$ crystal structure. (a) Side view of the unit cell along the [001] direction. (b) Perspective view of a polyhedron representation of the structure, in which the Si-only layer is shown as discrete atoms. (c) C49 $TiSi_2$ is stabilized by the nanonet morphology (left panel). The oxide coating is depicted as a green (or lightly shaded if presented in black and white) overlayer. The cartoons on the right show how $Li^+$ is incorporated into the Si-only layers.

A key uniqueness of the $TiSi_2$ nanonet lies in its crystal structure. As shown in FIG. 1, the structure consists of flat Si-only layers separated by polyhedrons of Ti and Si. Bulk C49 $TiSi_2$ has been demonstrated as metastable, transforming to a C54 structure upon heating. (Beyers, et al. 1985 J. Appl. Phys. 57, 5240-5245.) The latter structure is still of orthorhombic symmetry but lacks the Si-only layers. As such, $TiSi_2$ has not demonstrated an appreciable capacity. (Netz, et al. 2001 Ionics 7, 433-439.) Previously, it was reported that the nanonet form of C49 $TiSi_2$ is stable up to 900° C. (Zhou, et al. 2008 Angew. Chem., Int. Ed. 47, 7681-7684.) While the exact cause of the stabilization remains unknown, this new material serves as a platform to test the lithiation and delithiation properties of C49 $TiSi_2$. However, due to the reactions between $Li^+$ and Si, significant structural degradation of $TiSi_2$ was observed, leading to a loss of Ti into the electrolyte and the formation of amorphous Si on the nanonet surfaces. (Zhou, et al. 2010 ACS Nano 4, 7014-7020.)

In addition to the aforementioned reaction preventing long cycle lifetimes, it was also difficult to discern whether $Li^+$ was incorporated into the body of $TiSi_2$—a competing explanation of the observed capacity would be that it comes from surface reactions. Addressing these issues should help explain the detailed lithation mechanism. By forming a thin oxide coating on the surface of $TiSi_2$ nanonets, the stability issue was solved and it was determined that $Li^+$ reacts with Si in the body of $TiSi_2$. Specific capacities close to 800 mA h $g^{-1}$ were measured (705 mA h $g^{-1}$ at the $200^{th}$ cycle), and more than 80% of the original capacity was retained after 500 cycles of repeated lithiation and delithiation. It is important to note that the results disclosed herein are fundamentally different from previous reports where $TiSi_2$ nanonets were used as a charge collector to improve the performance of Si nanoparticles. (Zhou, et al. 2010 Nano Lett. 10, 860-863; Xie, et al. 2011 ACS Nano 5, 9225-9231.)

As disclosed herein, $TiSi_2$ nanonets of the C49 crystal structure and an easy-to-implement oxide coating provide a uniquely layered, non-graphite anode material. The stabilized material survives up to 500 cycles of lithiation and delithation, making it suitable for practical applications as electrodes for lithium-ion batteries. The stabilization also allowed detailed structural studies that confirmed that Li ions are indeed reversibly inserted and extracted from the Si-only layer in $TiSi_2$ nanonets. The simple and elegant structure of the invention allows significantly improved energy storage devices in regards to cyclability and power rate.

FIG. 1 schematically illustrates the C49 $TiSi_2$ crystal structure. FIG. 1a depicts the side view of the unit cell along the [001] direction. FIG. 1b shows the perspective view of a polyhedron representation of the structure, in which the Si-only layer is shown as discrete atoms. C49 $TiSi_2$, as illustrated in FIG. 1c, is stabilized by the nanonet morphology (left panel).

In one aspect, the invention generally relates to a titanium disilicide ($TiSi_2$) substrate characterized by a layered crystalline structure exhibiting Si only layers, wherein the $TiSi_2$ substrate is at least partially coated with a thin layer of an oxide having a thickness from about 0.1 nm to about 10 nm, preferably less than about 5 nm.

The oxide layer may be any suitable oxide, for example, $SiO_2$.

The thin layer of oxide preferably has a thickness particularly suited to the application at hand. For example, the preferred thickness may be from about 1 nm to about 5 nm.

The layered titanium disilicide crystalline structure is preferably C49 (base-centered orthorhombic) with the Si only layers being flat, planar and parallel layers.

In certain preferred embodiments, the titanium disilicide substrate is in the form of nanonets of desired dimensions pendent on the applications. The titanium disilicide nanonets may have dimensions from 0.1 μm to about 50 μm (e.g., from about 0.5 μm to about 25 μm, from about 1.0 μm to about 10 μm).

In another aspect, the invention generally relates to an anode material. The anode material includes the titanium disilicide substrate disclosed herein.

In yet another aspect, the invention generally relates to a battery comparing an anode comprising the titanium disilicide substrate disclosed herein. The anode material of the invention may be suited for use in lithium-ion batteries of various types.

In certain preferred embodiments, the battery has about 80% of the original capacity retained after 500 cycles.

In yet another aspect, the invention generally relates to an article of manufacture comprising a battery having an anode that comprises the titanium disilicide substrate disclosed herein.

In yet another aspect, the invention generally relates to a method for preparing nanonets of titanium disilicide ($TiSi_2$) useful as an anode material. The method includes: reacting $TiCl_4$ and $SiH_4$ in a $H_2$-rich environment at an elevated temperature for a time sufficient to form $TiSi_2$ nanonets; exposing as-formed $TiSi_2$ nanonets to ambient air; and allowing exposed $TiSi_2$ nanonets to cool to room temperature naturally to form a layer of $SiO_2$ thereon.

In certain preferred embodiments, the reaction of $TiCl_4$ and $SiH_4$ in a $H_2$-rich environment is carried out at a temperature of about 675° C.

In certain preferred embodiments, exposing as-formed $TiSi_2$ nanonets to ambient air is performed at a temperature of about 350° C.

In certain preferred embodiments, the formed nanonets have dimensions from about 0.1 μm to about 50 μm. In certain preferred embodiments, the layer of oxide has a thickness from about 0.1 to about 10 nm. In certain preferred embodiments, the $TiSi_2$ nanonets are characterized by a layered C49 (base-centered orthorhombic) crystalline structure exhibiting Si only layers, for example, flat, planar layers.

EXAMPLES

The $TiSi_2$ nanonets were obtained via the reaction between $TiCl_4$ and $SiH_4$ in a $H_2$-rich environment. A moderate growth temperature of 675° C. and a short growth time of 12 minutes yield a dense deposition. The average areal density of the synthesis was approximately 100 μg $cm^{-2}$. The oxide overlayer was formed by exposing as-synthesized $TiSi_2$ nanonets to ambient air at 350° C. and allowing them to cool to room temperature naturally. A TEM micrograph in the insert of FIG. 2 demonstrates that a 4 nm oxide coating, amorphous in nature, was obtained. Other oxidation conditions, including different temperatures, durations, or a combination of the two were also studied, and it was found that the reported conditions produced the best results. As will be discussed in more detail later, oxide coatings achieved via other methods such as atomic layer deposition (ALD) serve the purpose of stabilizing $TiSi_2$ almost as well.

Figure 2:
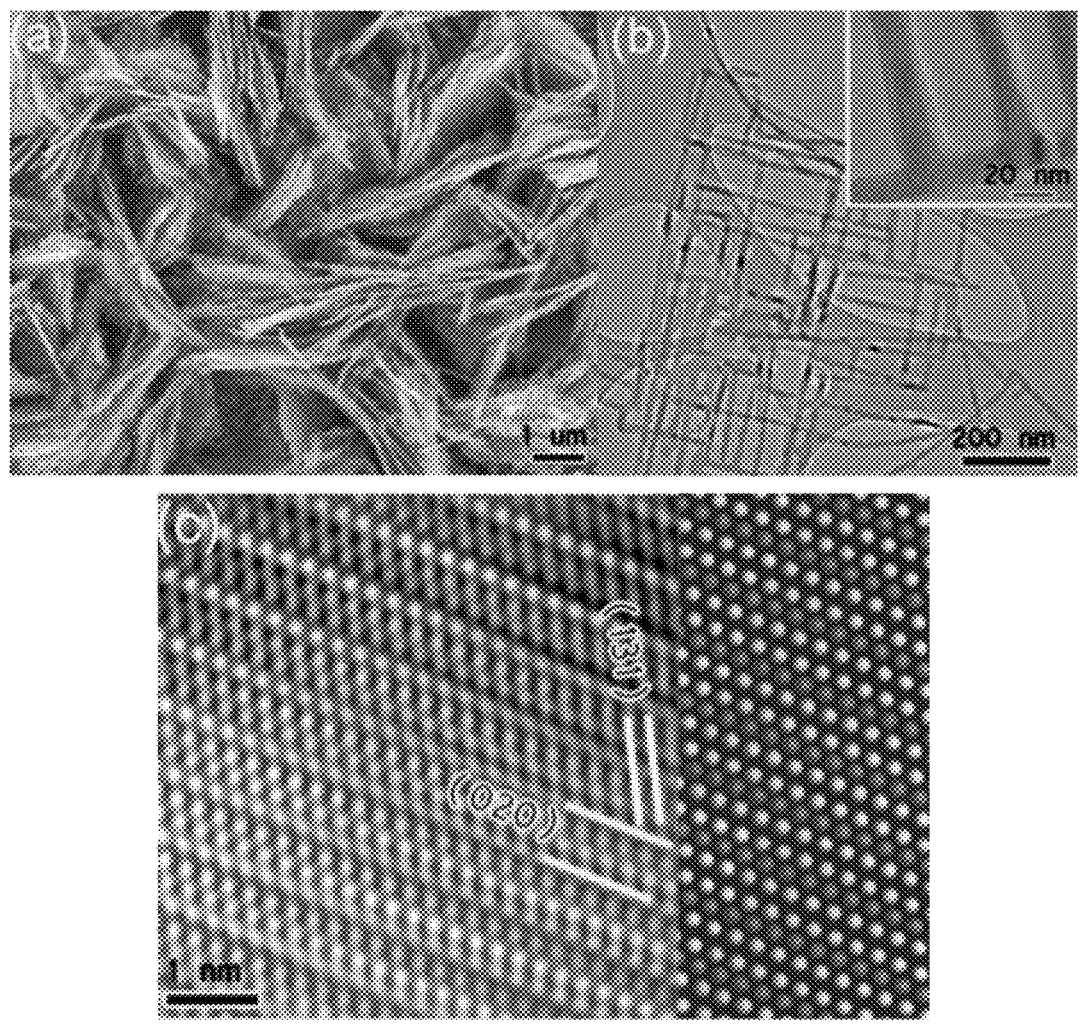
FIG. 2. Microstructures of oxide-coated $TiSi_2$ nanonets. (a) A scanning electron micrograph showing the high purity of the nanonets. (b) A low magnification transmission electron micrograph (TEM) revealing the two-dimensional connectivity of a nanonet. Inset: The oxide layer is clearly visible in the magnified view. (c) High resolution TEM viewed along the {020} plane. The experimental data (left) match the simulated data (right), confirming the layered structure of C49 $TiSi_2$.

Shown in FIG. 2 are microstructures of oxide-coated $TiSi_2$ nanonets, as follows: (a) A scanning electron micrograph showing the high purity of the nanonets; (b) A low magnification transmission electron micrograph (TEM) revealing the two-dimensional connectivity of a nanonet. The inset shows that the oxide layer is clearly visible in the magnified view; (c) High resolution TEM viewed along the {020} plane. The experimental data (left) match the simulated data (right), confirming the layered structure of C49 $TiSi_2$.

The resulting materials were tested using a two-electrode coin cell for charge/discharge characterizations or a three-electrode electrochemical cell for impedance studies. The typical charge/discharge behaviors are plotted in FIGS. 3a and 3b. A significant portion of the electrons that passed through the electrode during the first cycle were consumed in irreversible reactions, as evidenced by the disparity between the charge (lithiation; capacity: 3045 mA h $g^{-1}$) and discharge (delithiation; capacity: 943 mA h $g^{-1}$) curves. Similar behaviors have been frequently observed in other systems, although the exact nature of the irreversible processes remains unclear at this stage. (Chan, et al. 2009 *J. Power Sources* 189, 1132-1140.) The disparity between charge and discharge curves disappeared after the first 5 cycles. FIG. 3b shows the stability of oxide-coated $TiSi_2$ between the $6^{th}$ and $9^{th}$ cycles at a rate of 2000 mA $g^{-1}$, where the charge and discharge curves from each cycle overlap. Consistent with the plots, the calculated coulombic efficiencies were greater than 98%. Note that due to the limited data sampling capability at the relatively fast charge/discharge rate of 2000 mA $g^{-1}$ exhibited by the battery analyzer (BTS-5V1 mA, Neware, China) utilized in the cycling tests, the reported coulombic efficiencies may be systematically underestimated.

The stability of oxide-stabilized $TiSi_2$ nanonets can be better observed in the capacity versus cycle plots (FIG. 3c), where the charge/discharge tests were extended to 500 cycles. For this group of data, the first 5 cycles were carried out at a rate of 200 mA $g^{-1}$; this rate was increased by 10 fold for subsequent cycles. To avoid crowding the plots, one data point every 5 cycles is shown. The capacity decreased from 744 mA h g$^{-1}$ (at the 26$^{th}$ cycle) to 606 mA h g$^{-1}$ (at the 500$^{th}$ cycle), corresponding to an overall capacity decay of 18.8% or 0.04% per cycle. Again the calculated coulombic efficiency of greater than 98% was lower than the expected 99.96%, presumably due to system errors intrinsic to the instrumentation used.

The rate performance of TiSi$_2$ is noteworthy. For a measured capacity of 744 mA h g$^{-1}$ at a rate of 2000 mA g$^{-1}$, a charge or discharge process takes ca. 22 min. This rate performance is enabled by the good electrical conductivity of TiSi$_2$, ca. 10$^5$ S cm$^{-1}$. Because TiSi$_2$ nanonets were directly grown on conductive charge collectors, no binders were added to the system. The gaps between the beams of the TiSi$_2$ nanonets, typically larger than 50 nm, are expected to enable fast electrolyte diffusion as well. If one defines 1 C as 1029 mA g$^{-1}$, FIG. 3d plots how the capacity changed as the charge rates were varied between 0.3 C and 6 C. At 6 C (6174 mA g$^{-1}$), the measured capacity was 574 mA h g$^{-1}$, corresponding to 74% of the value at 0.3 C. Remarkably, more than 99.9% of the initial capacity was recovered when the cell was again measured at 1 C.

Figure 3:
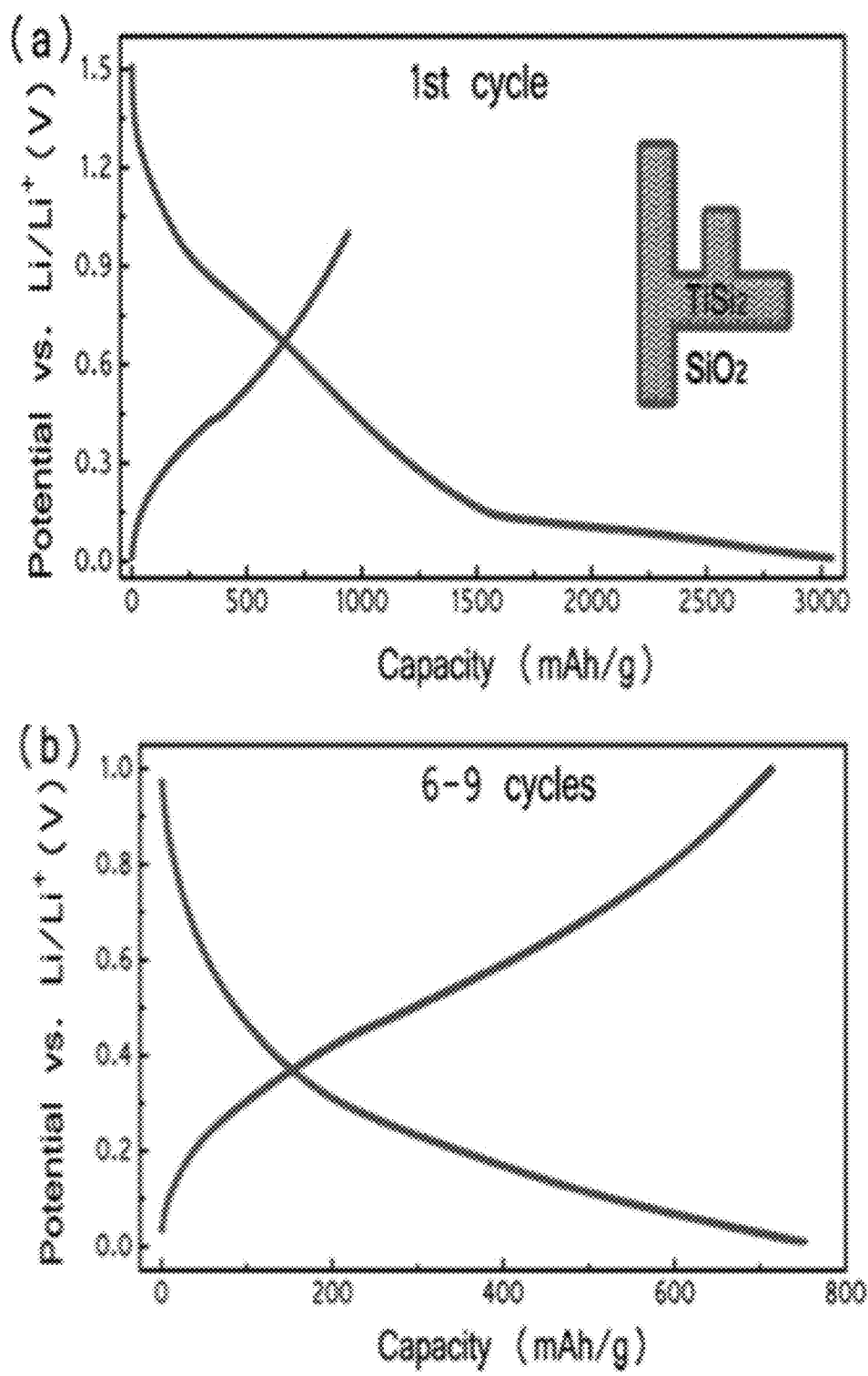
FIG. 3. Electrochemical properties of oxide-stabilized $TiSi_2$ nanonets. (a) Charge/discharge characteristics of the first cycle. Rate: 200 mA $g^{-1}$; potential range: 1.5 to 0.01 V. (b) Charge/discharge curves from cycles 6 to 9 overlapping each other. Rate: 2000 mA $g^{-1}$; potential range: 1.0 V to 0.01 V. (c) Retention of charge capacity and coulombic efficiency at a rate of 2000 mA $g^{-1}$. Potential range: 1.0 to 0.01 V. (d) Rate-dependent specific capacities. 1 C is equivalent to 1029 mA $g^{-1}$. Potential range: 1.0 to 0.01 V.
Figure 3:
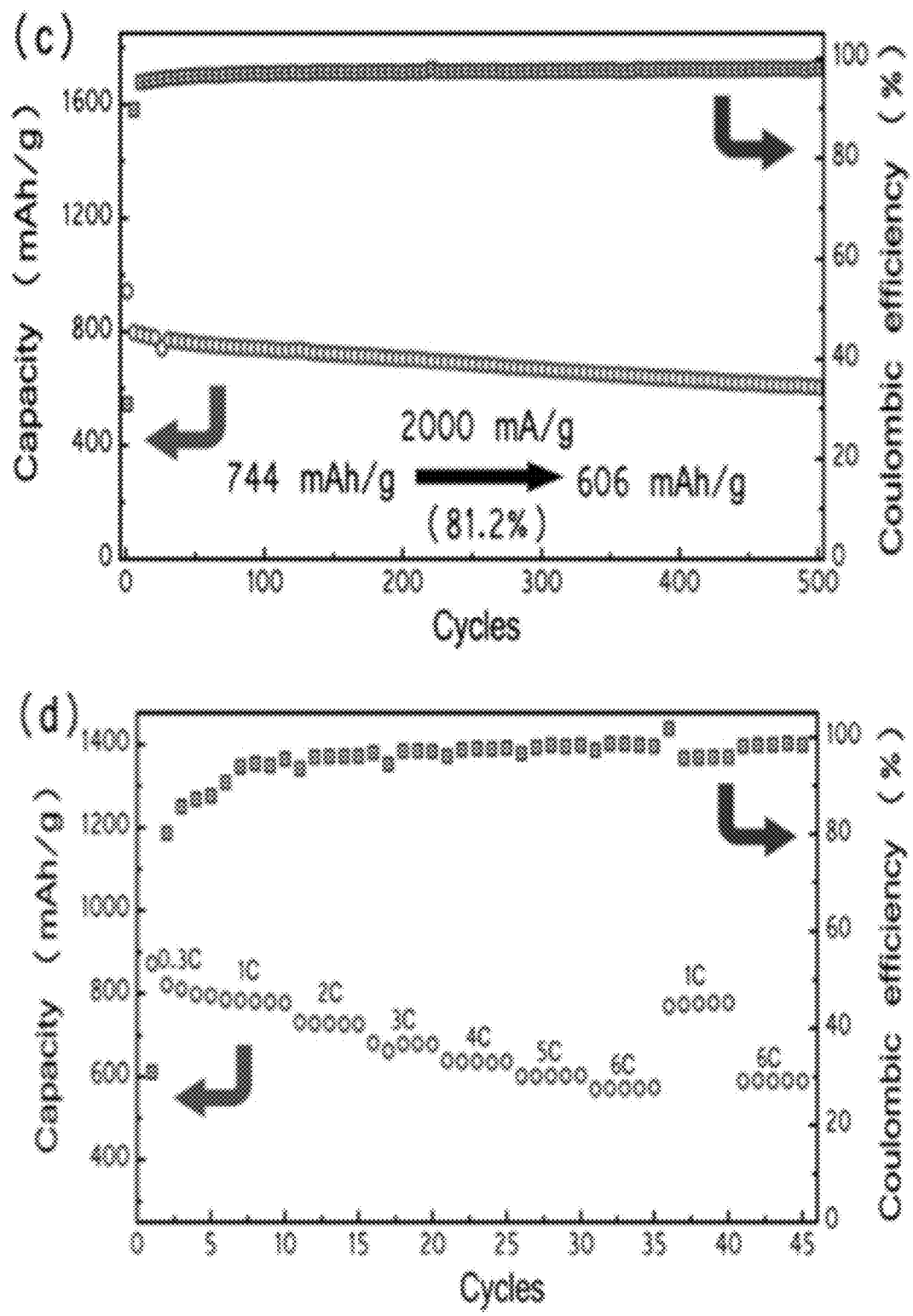

Electrochemical properties of oxide-stabilized TiSi$_2$ nanonets are shown in FIG. 3. (a) shows charge/discharge characteristics of the first cycle at rate of 200 mA g$^-$ and potential range of 1.5 to 0.01 V. (b) shows charge/discharge curves from cycles 6 to 9 overlapping each other with rate at 2000 mA g$^{-1}$ and potential range of 1.0 V to 0.01 V. (c) shows retention of charge capacity and coulombic efficiency at a rate of 2000 mA g$^{-1}$ and potential range of 1.0 to 0.01 V. (d) shows rate-dependent specific capacities with 1 C is equivalent to 1029 mA g$^{-1}$ and potential range of 1.0 to 0.01 V.

The 1 C value of 1029 mA g$^{-1}$ was obtained by using the schematic structure shown in FIG. 1c and assuming that only the Si layer contributes to the capacity. It was assumed that each Si atom can host 4 Li$^+$, leading to a lithiated formula of Li$_4$TiSi$_2$ and hence, a specific capacity of 1029 mA h g$^{-1}$. This coarse approximation lacks a theoretical basis and, as such, should only be regarded as a general reference. Notwithstanding the primitive estimation, this value is close to the measured specific capacities of 943 mA h g$^{-1}$ at a charge rate of 200 mA g$^{-1}$.

Figure 6:
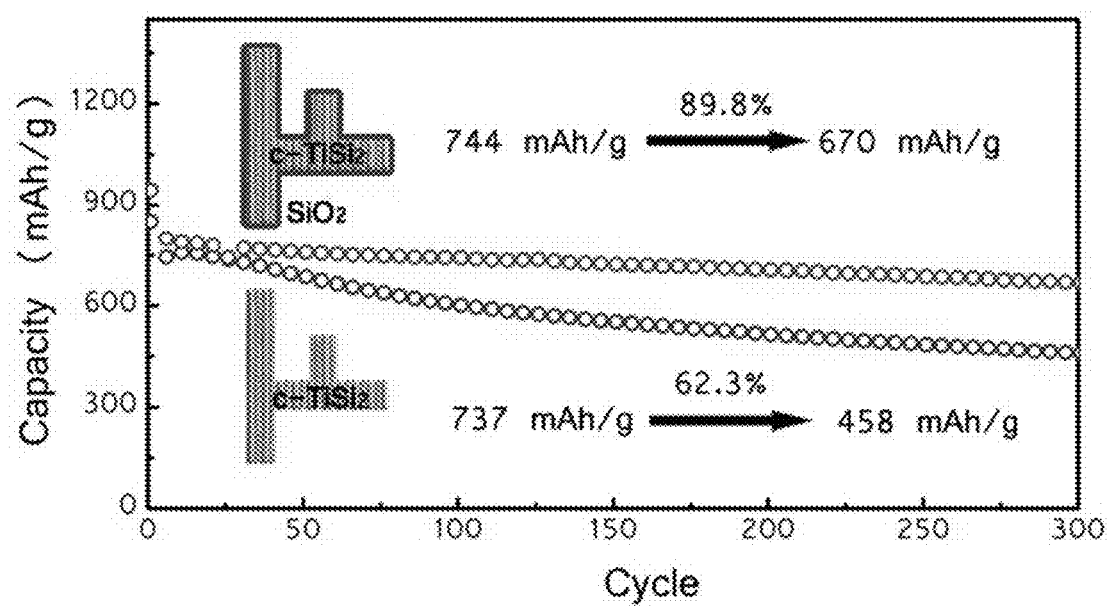
FIG. 6. Cycling performance of $TiSi_2$ nanonets with (green) and without (purple) $SiO_2$ (or lightly and darkly shaded, respectively, if presented in black and white). From the $26^{th}$ to $300^{th}$ cycles, $SiO_2$-coated nets maintained 89.8% of their capacity, while those without oxide only retained 62.3%. The result indicates the importance of the oxide overlayer for long cycling stability.
Figure 7:
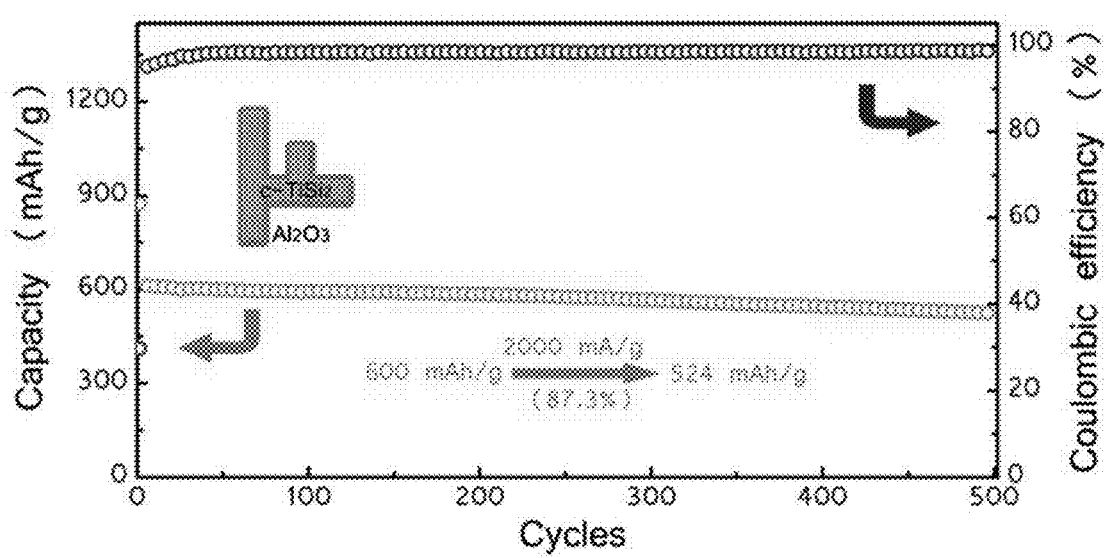
FIG. 7. Cycling stability of $TiSi_2$ nanonets with a 1 nm $Al_2O_3$ coating. Over 500 cycles the capacity maintains 87.3% of the initial value, with a coulombic efficiency close to 99%. Compared with a $SiO_2$ coated anode, the capacity of $Al_2O_3$-coated $TiSi_2$ is slightly lower. Without wishing to be bound by theory, one possibility is that ALD-grown $Al_2O_3$ may be less permeable to $Li^+$ than thermally formed $SiO_2$.

The oxide coating on TiSi$_2$ is indispensable to the performance of the TiSi$_2$ anode. The capacity of TiSi$_2$ without the addition of an intentional oxide layer faded at a rate more than double that of an oxide-coated sample (FIG. 6 and FIG. 7). (Xiao, et al. 2011 *Adv. Mater.* 23, 3911-3915; Cho, et al. 2001 *Angew. Chem., Int. Ed.* 40, 3367-3369; Kim, et al. 2004 *J. Electrochem. Soc.* 151, A1755-A1761; Fan, et al. 2007 *Electrochim, Acta* 52, 3870-3875; Fu, et al. 2006 *Solid State Sci.* 8, 113-128; Zhang, et al. 2007 *Electrochem. Commun.* 9, 886-890.) Some believe an oxide overlayer, when sufficiently thin, is permeable to ions (Li$^+$) but blocks electrons. The oxide layer in essence acts as a desired solid-electrolyte-interface (SEI) or serves to facilitate SEI formation. (Xiao, et al. 2011 *Adv. Mater.* 23, 3911-3915.) Others have propositioned that oxides, SiO$_2$ in particular, may participate in the charge/discharge processes by reacting with Li$^+$ to form Li$^+$ and SiO$_x$, where x<2. (Sun, et al. 2008 *Appl. Surf Sci.* 254, 3774-3779; Miyachi, et al. 2005 *J. Electrochem. Soc.* 152, A2089-A2091; Abel, et al. 2012 *ACS Nano* 6, 2506-2516.)

Figure 4:
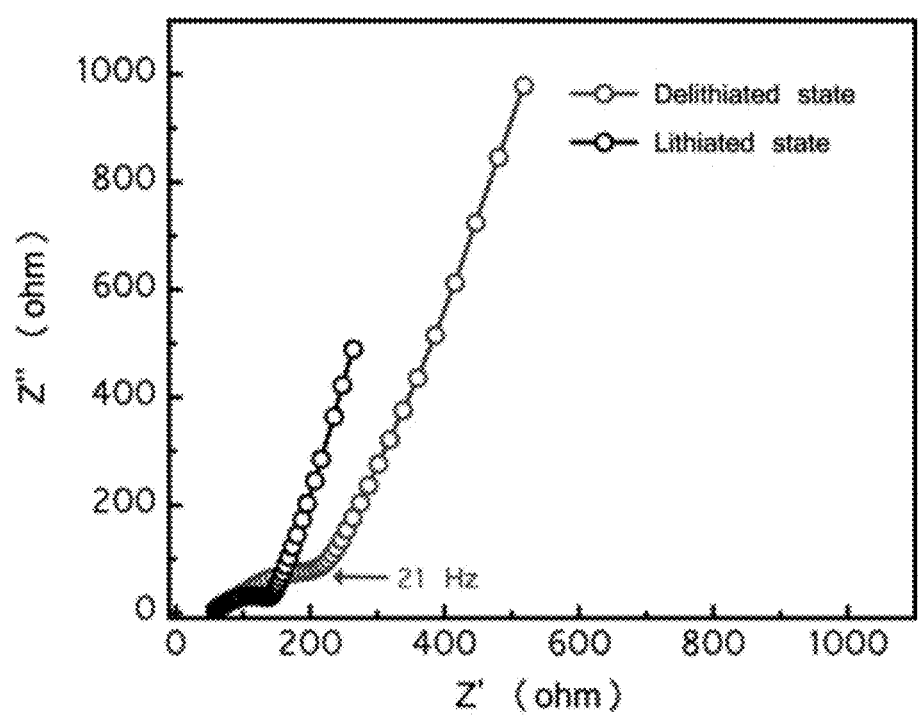
FIG. 4. Electrochemical impedance spectra (in the form of Nyquist plots) of oxide-stabilized $TiSi_2$ nanonets. The sample was first fully lithiated to 0.01 V at 100 mA $g^{-1}$ and the system was permitted to reach equilibrium for 2 hours before impedance data were taken. The frequency was varied between 50 kHz and 1 Hz, with an AC amplitude of 10 mV. Then the sample was discharged to 1V at 100 mA $g^{-1}$ and impedance data were collected under the same conditions.

In order to understand the nature of the improved performance imparted by an oxide coating, electrochemical impedance spectroscopy (EIS) measurements were carried out. The data for oxide-stabilized TiSi$_2$ in fully lithiated and delithiated forms are shown in FIG. 4, and they should be compared to previous work where EIS measurements of oxide-free TiSi$_2$ were reported. (Zhou, et al. 2010 *ACS Nano* 4, 7014-7020.) A fundamental difference is observed in the impedance after delithiation. For TiSi$_2$ without oxide, a drastic increase of impedance typically accompanied the delithation process; this change is attributed to changes in the SEI layer induced by lithiation and delithiation reactions. (Chan, et al. 2009 *J. Power Sources* 189, 1132-1140; Ruffo, et al. 2009 *J. Phys. Chem. C* 113, 11390-11398.)

Such an impedance change was largely absent in the oxide-stabilized TiSi$_2$ (FIG. 4). This result implies that the oxide overlayer indeed alters the nature of the SEI layer. Additionally, the oxide coating acts as a mechanical screen to prevent the exfoliation of layered TiSi$_2$ during lithiation, which would otherwise lead to an eventual mechanical breakdown of the electrode material. (Cho, et al. 2001 *Angew. Chem., Int. Ed.* 40, 3367-3369; Zhang, et al. 2007 *Electrochem. Commun.* 9, 886-890; Wu, et al. 2012 *Nat. Nanotechnol.* 7, 310-315.)

Figure 8:
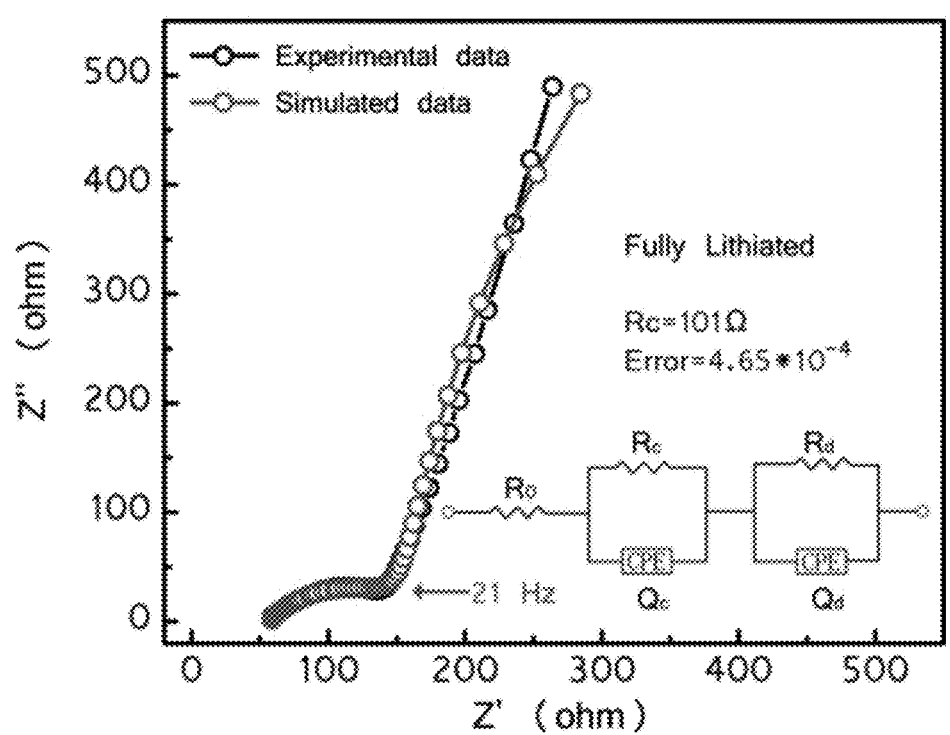
FIG. 8. Nyquist plot of $TiSi_2$ with $SiO_2$ at 0.01 V. The experimental data are shown in black and simulated data are obtained by fitting the experimental data with the inset equivalent electric circuit (EEC). (Ruffo, et al. 2009 J. Phys. Chem. C 113, 11390-11398.)

Taken as a whole, the improved SEI and the mechanical protection conferred by an oxide coating enable significantly enhanced cyclability of TiSi$_2$. In addition, by fitting the lithiated data, the charge transfer resistance was found to be only ca. 100Ω, indicating the good charge conduction of the oxide-coated TiSi$_2$ (FIG. 8). While it is clear that adding an oxide layer to the system is beneficial to the stability of the anode, it is not clear whether the conferred stability is solely due to properties of the oxide or due to the possible modification of the SEI layer. Therefore, the important role of the SEI layer should not be downplayed.

Electrochemical impedance spectra (in the form of Nyquist plots) of oxide-stabilized TiSi$_2$ nanonets are shown in FIG. 4. The sample was first fully lithiated to 0.01 V at 100 mA g$^{-1}$ and the system was permitted to reach equilibrium for 2 hours before impedance data were taken. The frequency was varied between 50 kHz and 1 Hz, with an AC amplitude of 10 mV. Then the sample was discharged to 1V at 100 mA g$^{-1}$ and impedance data were collected under the same conditions.

Figure 5:
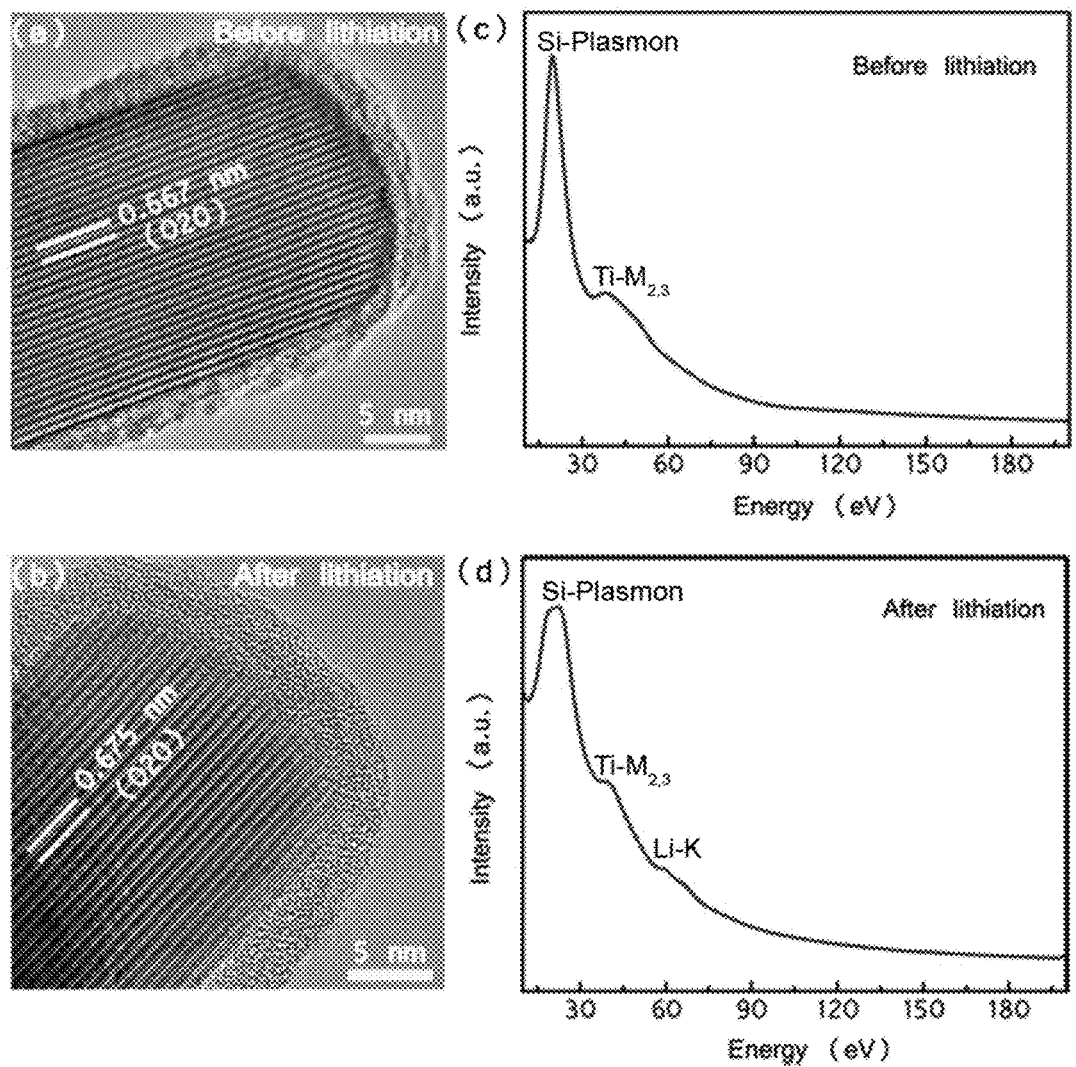
FIG. 5. High-resolution TEM images of $TiSi_2$ before (a) and after (b) lithiation. (c) and (d): Electron energy loss spectroscopy of a $TiSi_2$ nanonet before and after lithiation.

Shown in FIG. 5 are high-resolution TEM images of TiSi$_2$ are shown in: (a) before and (b) after lithiation; and electron energy loss spectroscopy of a TiSi$_2$ nanonet: (c) before and (d) after lithiation.

Figure 9:
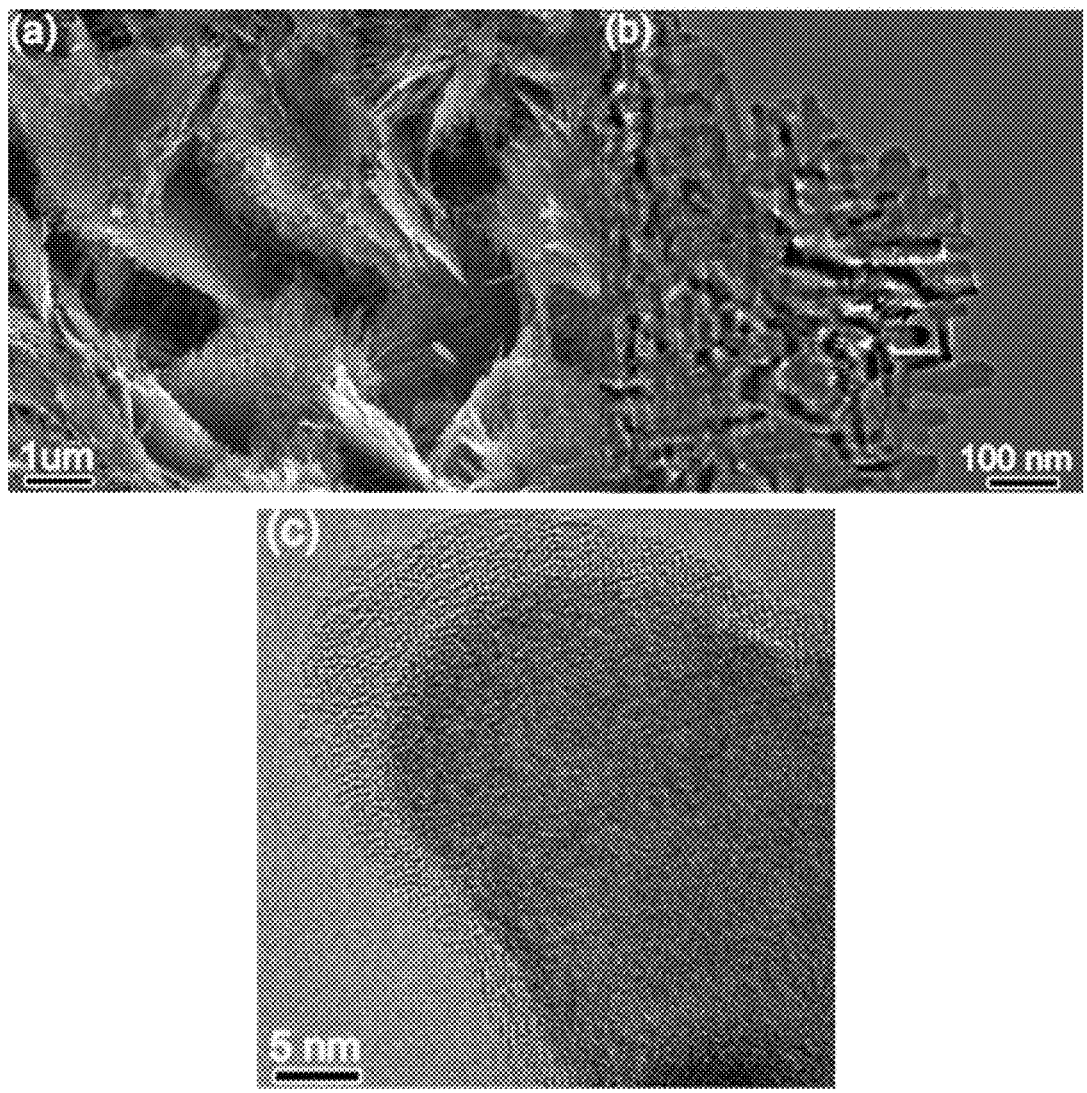
FIG. 9. Electron micrographs of $TiSi_2/SiO_2$ after 100 cycles of lithiation/delithiation. (a) A SEM image displaying the densely packed nanonets on the substrate. (b) A low magnification TEM image confirming the well preserved nanonet morphology. (c) A high resolution TEM image shows the crystalline nature of the nanonets after 100 cycles.
Figure 10:
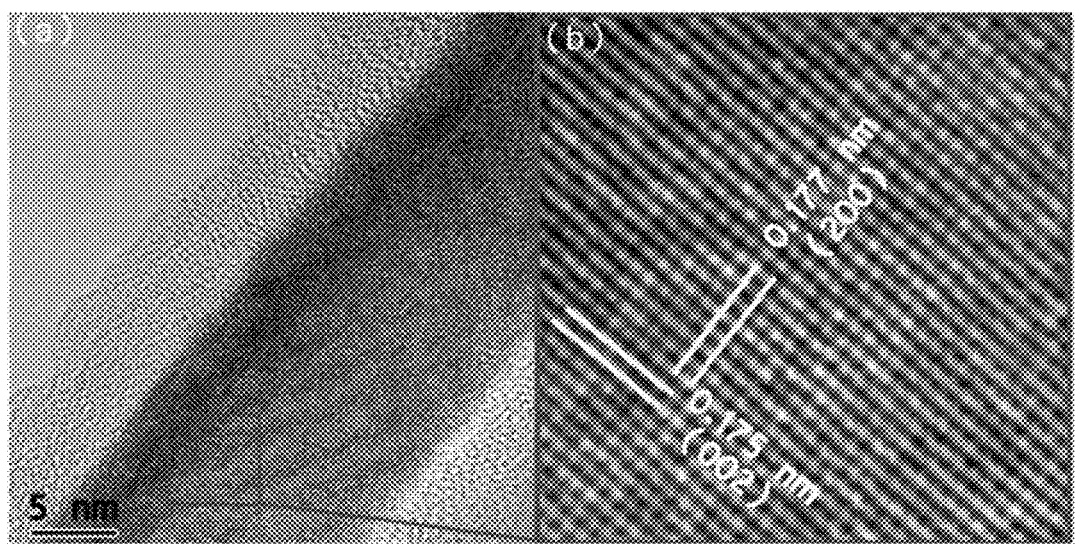
FIG. 10. TEM images of fully lithiated $TiSi_2$ nanonets (0.01V). The enlarged image indicates the lattice of $TiSi_2$ along [002] and [200] directions does not exhibit obvious expansion upon full lithiation.
Figure 11:
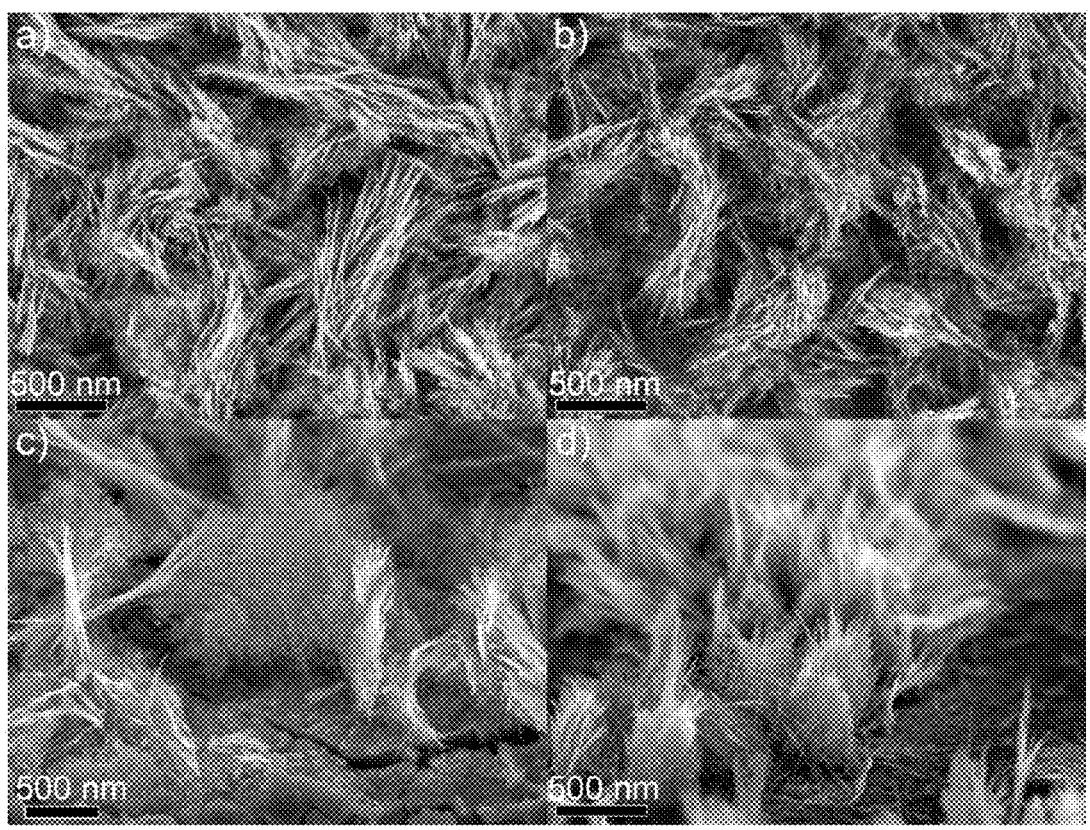
FIG. 11. SEM images from the top (a, b) and side (c, d) of $TiSi_2/SiO_2$ nanonets before lithiation (a, c) and after complete lithiation (b, d). The lithiated nets were cycled twice and then fully lithiated within a potential window of 1.0-0.10 V.
Figure 12:
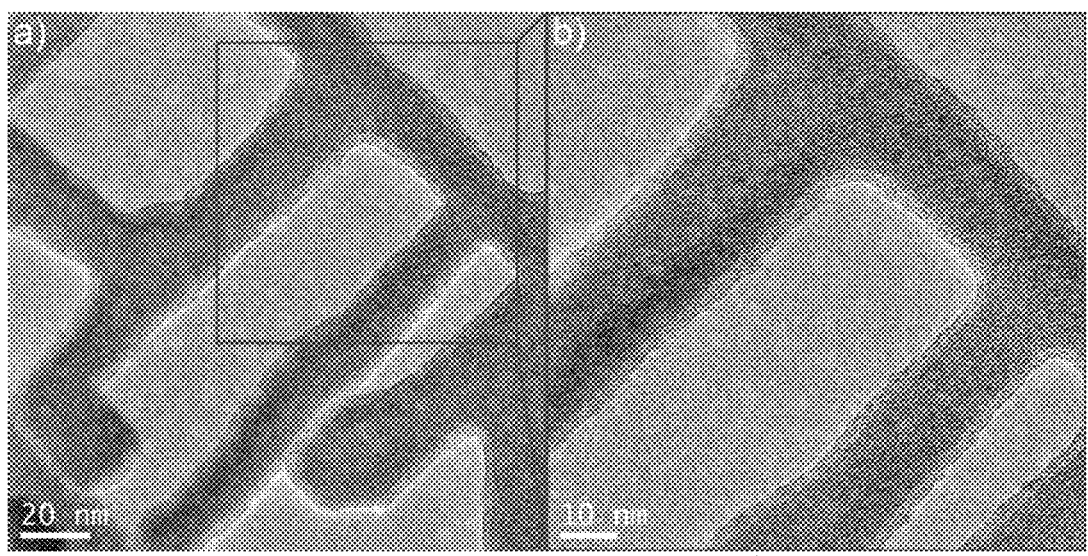
FIG. 12. (a) TEM image of a section of a $TiSi_2$ nanonet demonstrating the uniformity of the $SiO_2$ coating (b) a higher magnification image of the same section for more detail is presented here. Because the coating was not formed due to a post-growth deposition, but rather formed by the oxidation of the nanostructure, the uniformity of the coating is good.
Figure 13:
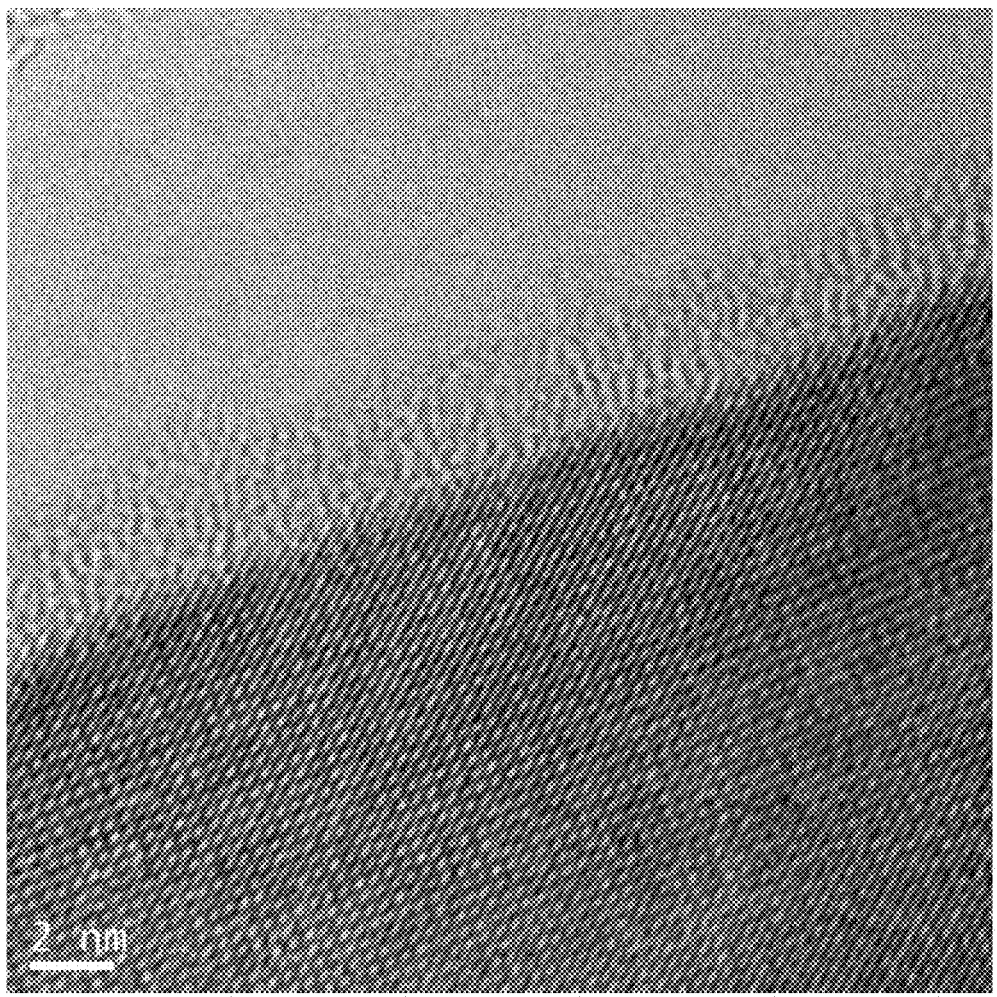
FIG. 13. A high-resolution TEM image depicting the interface between the $TiSi_2$ nanonet and the $SiO_2$ coating.

Comparing the lattice spacing of the TiSi$_2$ {020} planes before and after lithiation, it was observed an increase from 0.667 nm to 0.675 nm, corresponding to a 1.2% change, and no measurable difference was observed along other crystal planes (FIG. 10). This small but non-negligible change indicates the insertion of Li$^+$ into the {020} planes, where Si-only layers reside. This is supported by the electron energy loss spectroscopy (EELS) result, which confirms the existence of Li ions in the lithiated sample (FIG. 5d). In contrast, no Li signal was detected from the as-grown sample (FIG. 5c). Benefiting from the small volume change upon Li$^+$ insertion and extraction, the layered-structure TiSi$_2$ exhibits better cycling stability than other Si-based alloys. In addition, the nanonet morphology and crystalline nature are well preserved after 100 cycles (FIG. 9).

Based on the observed d-spacing change presented in FIG. 5, the shift in the (020) peak position would be 0.16°; this shift is based on the calculated values of 13.27° and 13.11°. In addition to the small peak shift, the (020) peak is not present is XRD diffraction patterns collected from as-grown TiSi$_2$ nanonets. (Zhou, et al. 2009 *Chem. Mater.* 21, 1023-1027.) The broadening of the diffraction peak due to the small size of the nets would also complicate matters.

Finally, the (060) peak could possibly be used, but it is partially eclipsed by the presence of the (131) peak. (Zhou, et al. 2009 *Chem. Mater.* 21, 1023-1027.)

EXPERIMENTAL

TiSi$_2$ Synthesis

TiSi$_2$ nanonets were synthesized by chemical vapor deposition (CVD). Briefly, 50 sccm (standard cubic centimeters per minute) SiH$_4$ (10% in He), 2.5 sccm TiCl$_4$ (Sigma-Aldrich, 98%) and 100 sccm H$_2$ (Airgas) were delivered into a heated reactor in tandem. By keeping the reactor at 675° C. and 5 Torr for 12 min, it was possible to collect highly dense TiSi$_2$ nanonets on a piece of Pt-coated Ti foil (Sigma). The supplies of precursors were then cut off and the reactor was cooled down to room temperature with H$_2$ protection. The sample was then immediately transferred into an Ar-filled glove-box (O$_2$<2 ppm; Vacuum Atmosphere Co.) for coin-cell or electrochemical cell fabrications.

TiSi$_2$/SiO$_2$ Synthesis

The TiSi$_2$ nanonets with SiO$_2$ coatings were produced in the same fashion as those above, except that the reactor was opened to air at an elevated temperature (350° C.). A layer of SiO$_2$ was thermally formed during the cooling process.

TiSi$_2$/Al$_2$O$_3$ Synthesis

After growth, the TiSi$_2$ nanonets were transferred into the atomic layer deposition (ALD) chamber immediately. Trimethylaluminum (TMA) (Sigma) and water were kept at room temperature and used as the Al and O precursors, respectively. The chamber was maintained at 200° C. during growth. The pulse time and purge time were 15 ms and 10 s for both TMA and water, respectively.

Coin Cell Fabrication

The as-synthesized samples were cut into 0.5×0.5 cm$^2$ pieces and assembled into CR2032-type coin cells with Li foils (Sigma-Aldrich; 0.38 mm) in a glove box by a hydraulic crimping machine (MTI). 1.0 M LiPF$_6$ in 1:1 wt/wt ethylene carbonate and diethyl carbonate (Novolyte Technologies) was used as electrolyte. Two CR2500 membranes (Celgard) were employed as a separator between the two electrodes.

Electrochemical Tests

After assembly, the coin cells were kept in a home-built box at a constant temperature of 30° C. The cycling stability was characterized by a 16-channel battery analyzer (Neware, China; current range: 1 μA-1A).

The electrochemical impedance measurements were conducted using a CHI 600C potentiostat/galvanostat in an electrochemical cell. Two Li foils were used as both counter and reference electrodes, respectively. After fully lithiating or delithiating the materials at a slow charging/discharging rate (100 mA g$^{-1}$), the electrochemical cell was allowed to equilibrate for 2 hours before collecting impedance data. The frequency was set between 50 kHz and 0.1 Hz, with 10 mV AC amplitude. All simulations were performed using ZsimpWin.

Structure Characterization

To obtain the structural information of the nanonets after testing, coin cells were opened in a glove box and the tested electrodes were soaked in dimethoxyethane (DME; Sigma; anhydrous; 99.5%) for 24 hours to remove any electrolyte. The solvent was refreshed every 4 hours. The morphology was characterized by a scanning electron microscope (SEM, model JSM 6340) and a transmission electron microscope (TEM, model JEOL 2010 F).

Electron Energy Loss Spectroscopy (EELS)

EELS measurements were conducted for both un-lithiated and lithiated samples. The measurements were conducted on a JEM-2010F TEM equipped with a parallel detection EELS spectrometer.

Electrochemical Impedance Spectroscopy (EIS) Measurement

The Nyquist plot of a fully lithiated sample is shown in FIG. 6, along with a fitting curve generated by the displayed equivalent electric circuit (EEC). The Nyquist plot comprises a semi-circle and an inclined line; these components contain the information pertaining to the charge transfer and Li$^+$ diffusion in the electrode. Two R//Q elements, $R_c//Q_c$ and $R_d/Q_d$, were employed to simulate these processes, resulting a fitting error of 4.65×10$^{-4}$ ($\chi^2$ value between experimental and simulated data). From the fitting result, a $R_c$ value of 101Ω was calculated. The $Q_c$ information is as follows: CPE=8.158×10$^{-5}$Ω$^{-1}$ s$^n$; n=0.6335.

Method for the Determination of the Quantity of Nanonets on a Sample.

To measure the amount of active material deposited on a sample, a small piece of the substrate containing the active material was weighed 9 times using a Sartorius CPA2P microbalance. The average mass was calculated; after obtaining the average mass, the active material was removed. After removing the active material, the bare substrate was weighed 9 times, and the mass was averaged. The mass of the bare substrate was subtracted from that of the substrate and active material. The area of the sample was also measured using a pair of digital callipers. With the area and mass, the areal density was calculated. The average areal density of the samples was approximately 100 μg cm$^{-2}$, and the average active material mass was 20 μg.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:

1. A titanium disilicide ($TiSi_2$) substrate characterized by a layered crystalline structure exhibiting Si only layers, wherein the $TiSi_2$ substrate is at least partially coated with a thin layer of $SiO_2$ having a thickness from about 1 nm to about 5 nm.

2. The titanium disilicide substrate of claim 1, wherein Si only layers are flat, planar layers.

3. The titanium disilicide substrate of claim 2, wherein the layered crystalline structure is C49 (base-centered orthorhombic).

4. The titanium disilicide substrate of claim 1, being in the form of nanonets.

5. The titanium disilicide substrate of claim 1, wherein the nanonets have dimensions from 0.1 μm to about 50 μm.

6. The titanium disilicide substrate of claim 1, prepared from $TiCl_4$ and $SiH_4$.

7. The titanium disilicide substrate of claim 6, wherein the preparation is conducted in a $H_2$-rich environment at an elevated temperature.

8. An anode material comprising the titanium disilicide substrate of claim 1.

9. A battery comprising an anode that comprises the titanium disilicide substrate of claim 1, wherein the battery has 80% of the original capacity retained after 500 cycles.

10. The battery of claim 9, being a lithium-ion battery.

11. An article of manufacture comprising a battery of claim 10.

* * * * *